US006253862B1

(12) United States Patent
Overstreet et al.

(10) Patent No.: US 6,253,862 B1
(45) Date of Patent: Jul. 3, 2001

(54) EARTH-BORING BIT WITH CUTTER SPEAR POINT HARDFACING

(75) Inventors: James L. Overstreet, Webster; Ronald L. Jones, Cleveland; Alan J. Massey, Houston; Trevor M. McAninch, Willis; Jeremy K. Morgan, Conroe, all of TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/245,702

(22) Filed: Feb. 3, 1999

(51) Int. Cl.[7] ....................................... E21B 10/00
(52) U.S. Cl. ..................... 175/374; 175/341; 175/375; 175/331
(58) Field of Search ..................... 175/374, 375, 175/341, 331

(56) References Cited

U.S. PATENT DOCUMENTS

| | | |
|---|---|---|
| 2,192,591 | 3/1940 | Alexander . |
| 2,200,487 | 5/1940 | Calvert . |
| 2,266,351 | 12/1941 | Zschokke . |
| 2,327,141 | 8/1943 | Spencer . |
| 2,331,057 | 10/1943 | Spencer . |
| 2,533,258 * | 12/1950 | Morlan et al. ........................ 175/341 |
| 2,759,417 | 8/1956 | O'Neill, Jr. . |
| 2,889,774 | 6/1959 | Allen . |
| 2,927,534 | 3/1960 | LeBus . |
| 4,593,776 | 6/1986 | Salesky et al. . |
| 4,726,432 * | 2/1988 | Scott et al. ............................ 175/375 |
| 4,726,531 | 2/1988 | Oestreich et al. . |
| 4,727,942 * | 3/1988 | Galle et al. .......................... 175/228 |
| 4,744,424 | 5/1988 | Lendermon et al. . |
| 4,814,234 | 3/1989 | Bird . |
| 5,279,374 | 1/1994 | Sievers et al. . |
| 5,348,770 | 9/1994 | Sievers et al. . |
| 5,492,186 * | 2/1996 | Overstreet et al. .................. 175/374 |
| 5,535,838 * | 7/1996 | Keshavan et al. ................... 175/374 |
| 5,542,480 | 8/1996 | Owen et al. . |
| 5,598,891 | 2/1997 | Snider et al. . |
| 5,638,901 | 6/1997 | Shirley et al. . |
| 5,653,299 * | 8/1997 | Sreshta et al. ...................... 175/374 |
| 5,662,178 | 9/1997 | Shirley et al. . |
| 5,663,512 * | 9/1997 | Schader et al. ....................... 75/239 |
| 5,785,130 | 7/1998 | Wesson et al. . |
| 5,816,343 | 10/1998 | Markel et al. . |

* cited by examiner

*Primary Examiner*—Paul N. Dickson
*Assistant Examiner*—Joselynn Y. Sliteris
(74) *Attorney, Agent, or Firm*—James E. Bradley; Bracewell & patterson, L.L.P.

(57) ABSTRACT

An earth-boring bit has rolling cutters, each attached to a bit leg depending from a bit body. Each of the cutters has hardfaced, milled teeth. A spear point is located on one of the cutters. The spear point has a neck that protrudes toward the axis of the bit from a conical portion of the cutter. Blades are located on the spear point with spaces located between the blades. A layer of hardfacing is applied to the entire spear point area including the blades, the spaces and the neck.

2 Claims, 3 Drawing Sheets

EARTH-BORING BIT WITH CUTTER SPEAR POINT HARDFACING

TECHNICAL FIELD

This invention relates in general to earth-boring bits having rotating cutters with milled teeth, and in particular to an earth-boring bit having one cutter with a spear point which has hardfacing for erosion protection.

BACKGROUND ART

Earth-boring bits of the type concerned herein have a bit body with three depending bit legs. A rolling cutter is rotatably mounted to each bit leg. Each cutter has a plurality of rows of milled teeth formed in the cutter shell by machining. The teeth are hardfaced with hardfacing that is typically tungsten carbide in an alloy steel matrix. One of the cutters has what is referred to as a spear point.

The spear point protrudes from an apex of the cutter shell to the vicinity of the longitudinal axis of the bit. This spear point has a neck which joins a conical portion of the cutter shell. A plurality of blades extend from the neck and converge to an apex. Hardfacing is applied to the blades, the hardfacing being the same type as used on the teeth. The blades have valleys or spaces between them. The neck and the spaces between are free of any hardfacing.

Bits of this type often have a center nozzle as well as lateral nozzles. The center nozzle is located on the longitudinal axis of the bit. The lateral nozzles are located at the sides of the bit body between two of the legs. The nozzles communicate with a central passage in the bit body for discharging drilling mud. The high pressure jets being discharged through the nozzles circulate cuttings back to the surface through an annulus surrounding the drill string. The drilling fluid being discharged through the center jet directly impinges on the spear point. The drilling fluid is abrasive and causes erosion to the cutter shell, eroding the neck and the valleys of the spear point. Even though the blades are hardfaced, eventually the spear point may break off. Once broken off, it is likely to interfere with the teeth of the cutters, causing tooth breakage. This leads to premature failure of the bit.

Another type of earth-boring bit uses tungsten carbide inserts pressed into mating holes formed in the cutter shell. These insert bits typically do not utilize a center jet. Insert bits of this nature have also been used in mining operations. In a mining operation, air is discharged through the nozzles, rather than drilling fluid. Air is normally not considered abrasive, unlike drilling mud. In one instance, hardfacing was placed on the spear point area surrounding TCI inserts of a mining bit to avoid erosion to the shell due to contact with the earth formation.

SUMMARY OF THE INVENTION

In this invention, the bit has a cutter which has milled teeth and a spear point. The spear point has a neck that joins a smooth portion of the cutter and blades that extend from the neck and converge to an apex. The blades define valleys or spaces between them.

A layer of hardfacing is applied to the entire spear point including the interim spaces and the neck. This hardfacing may be of a conventional type comprising tungsten carbide particles in a steel alloy matrix. The hardfacing thickness is similar to that applied to teeth, being in the range from about 0.020 inch to 0.250 inch, preferably about 0.100 inch.

BEST MODE FOR CARRYING OUT THIS INVENTION

Figure 1:
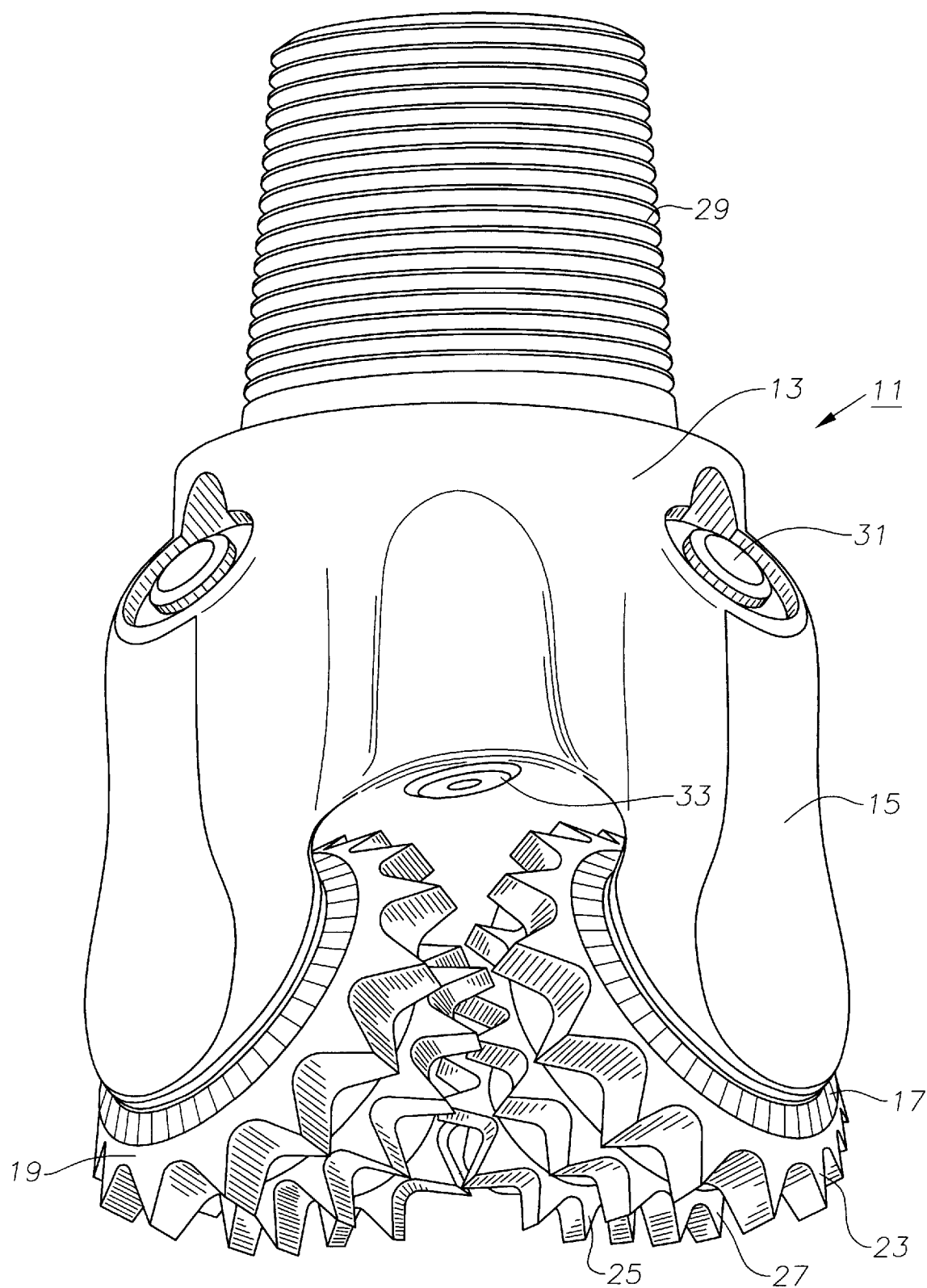
FIG. 1 is a side elevational view of an earth-boring having milled teeth cutters.
Figure 2:
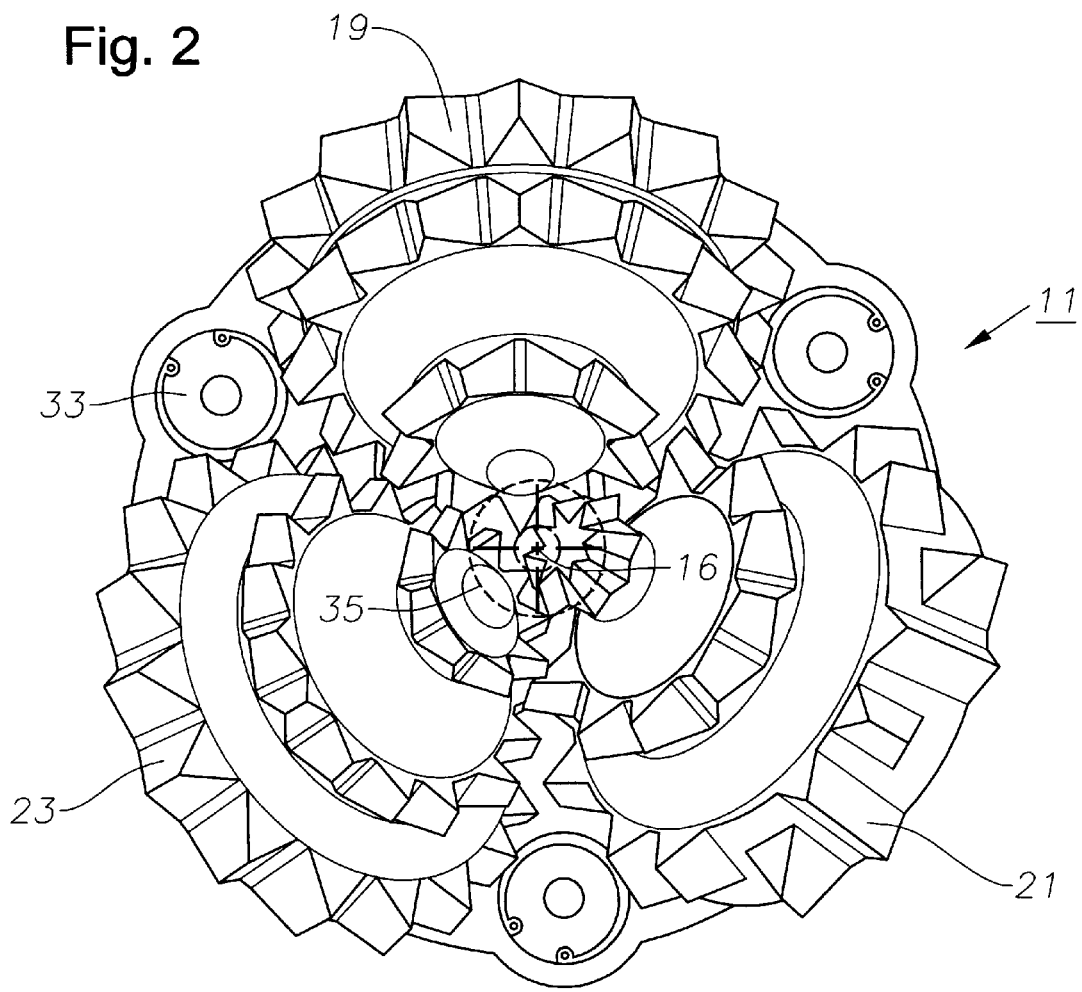
FIG. 2 is a schematic bottom view of the earth-boring bit of FIG. 1.

Referring to FIGS. 1 and 2, bit 11 has a body 13. Body 13 has three bit legs 15 which depend from it, legs 15 being equally spaced about a longitudinal bit axis 16 (FIG. 2). First, second and third cutters 17, 19, 21 are rotatably mounted to the three bit legs 15. Each cutter 17, 19, 21 has an outer tooth row 23, an inner tooth row 25 and, in the embodiment shown, an intermediate tooth row 27. Alternately, cutters 17, 19, and 21 may have fewer or more rows of teeth. The teeth of each tooth row 23, 25, 27 are milled or machined from the steel shell of each cutter 17, 19, 21. The teeth of rows 23, 25, 27 are hardfaced in a conventional manner.

Bit 11 has a threaded end 29 which secures to a drill string. Lubricant compensators 31 of conventional design contain lubricant within the bearings of the cutters 17, 19, 21 and equalize the pressure therein with hydrostatic pressure in the well bore. Bit 11 has three lateral nozzles 33 located 120 degrees apart relative to the longitudinal bit axis 16. Lateral nozzles 33 are located at the sides of bit body 13, one between each of the bit legs 15. Bit 11 also has a center nozzle 35 which is located substantially on bit axis 16. Nozzles 33 and 35 communicate with a cavity in body 13, the cavity in turn communicating with a fluid passage in the drill string. Drilling mud pumped down the drill string will discharge out nozzles 33, 35.

Figure 3:
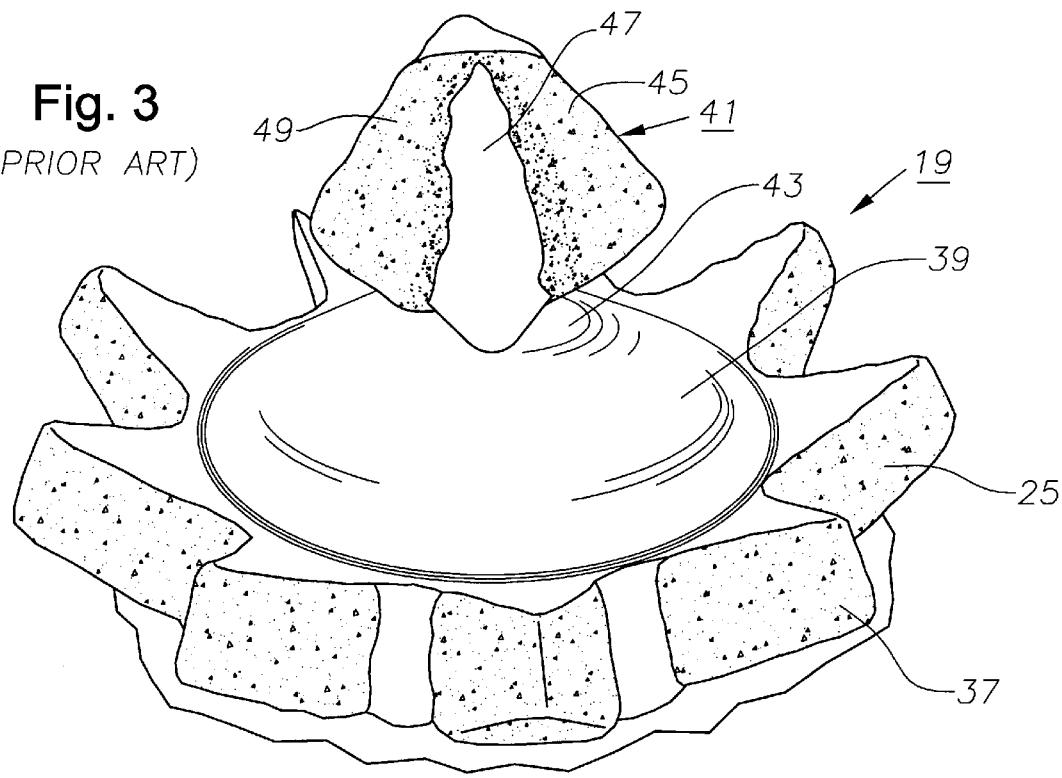
FIG. 3 is an enlarged perspective view of a portion of a prior art cutter.

Referring to FIG. 3, a prior art cutter 19 is shown. Inner row teeth 25 have a layer of hardfacing 37 that has been applied in a conventional manner. The shell of cutter 19 has a smooth conical portion 39 that extends inward toward bit axis 16 (FIG. 2) from inner teeth row 25. A spear point 41 joins conical portion 39 and protrudes farther inward, terminating approximately at bit axis 16. Only one of the three cutters 17, 19 and 21 has a spear point 41. Spear point 41 is machined from the shell of cutter 19 and has a cylindrical neck 43 that joins conical portion 39. A plurality of blades 45 are located on spear point 41, each blade protruding radially from the cutter 19 axis of rotation. Blades 45 extend inward on an axis of cutter 19 toward bit axis 16, converging to an apex or tip. Blades 45 are spaced circumferentially about the axis of cutter 19, defining valleys or spaces 47 between them. Typically, there will be two or three blades on spear point 41.

In this prior art type of FIG. 3, spaces 47 and neck 43 remain free of hardfacing. Hardfacing 49, however, is applied to each of the blades 45. The unhardfaced neck 43 and spaces 47 are exposed to the discharge from center nozzle 35 (FIG. 2). This causes significant erosion and early breakage of spear point 41 from cutter 19.

Figure 4:
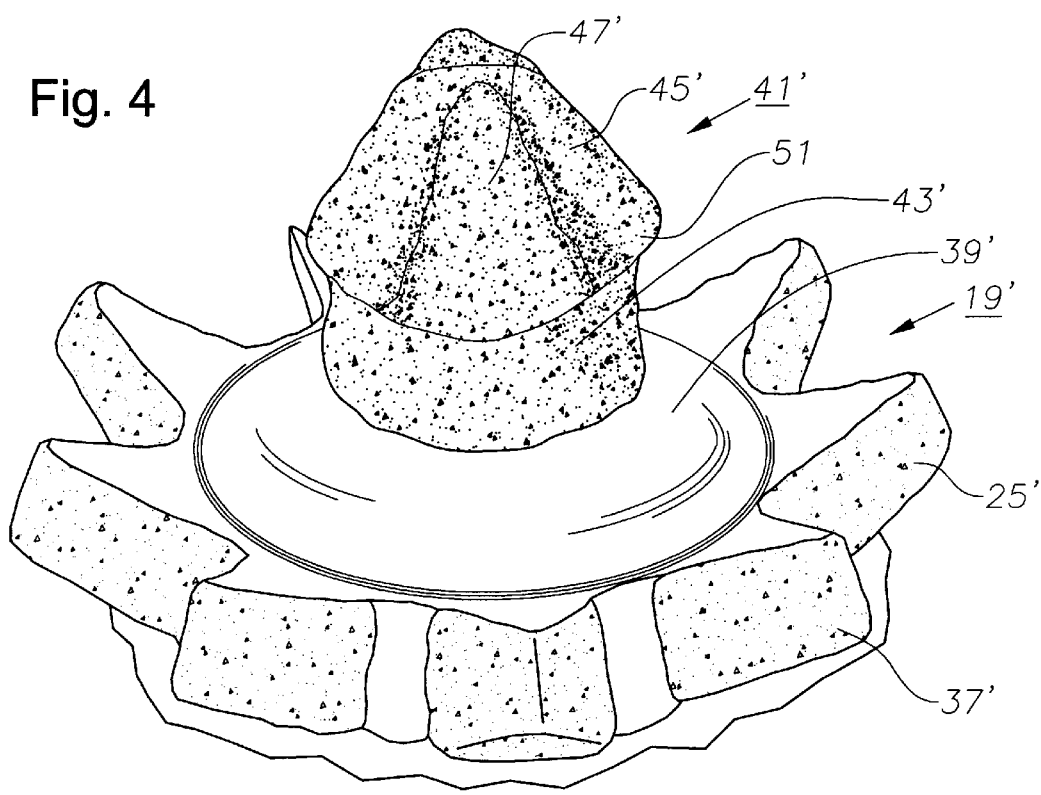
FIG. 4 is a perspective view of a portion of a cutter constructed in accordance with this invention.

A prime symbol (') has been added to the numerals for the components of cutter 19' of FIG. 4 for comparison with the prior art cutter of FIG. 3. Cutter 19' has the same underlying structure as cutter 19. It has an inner teeth row 25' which contain a layer of hardfacing 37'. Conical portion 39', which extends inward from inner teeth row 25', is smooth and free of hardfacing. A layer of hardfacing 51 completely coats spear point 41'. Hardfacing 51 covers not only blades 45', but also spaces 47' and neck 43'. Hardfacing 51 terminates at the base of neck 43' where it joins conical portion 39'. Hardfacing 51 may be of any type suitable for application on teeth 25'.

Hardfacing 51 is preferably of the same type as hardfacing 49 on blades 45 of the prior art, this being tungsten carbide particles or granules in an alloy steel matrix. However, a variety of other types of hardfacing are available. Hardfacing 51 is applied in a conventional manner. This may be done by a variety of techniques. The preferred manner is by utilizing a torch and a hollow welding rod of alloy steel filled with tungsten carbide particles. The thickness of hardfacing 51 is in the range from about 0.020 to 0.250 inch.

In operation, as bit 11 rotates, each cutter 19, 21, 17 rotates about its own axis. Drilling mud is pumped down the drill string, which discharges out nozzles 33, 35. A portion of the drilling fluid being discharged from center nozzle 35 strikes spear point 41'. Erosion from the drilling mud, however, is retarded by hardfacing 51.

The invention has significant advantages. Applying the hardfacing layer to the entire spear point area reduces breakage of the spear point due to excessive erosion from drilling fluid being discharged out a center nozzle. By reducing the chances for tooth breakage, the effective running time of the bit is increased.

While the invention has been shown in only one of its forms, it should be apparent to those skilled in the art that it is not so limited, but is susceptible to various changes without departing from the scope of the invention.

What is claimed is:

1. An earth-boring bit, comprising in combination:

a body with a longitudinal axis;

three bit legs depending from the body;

a nozzle located generally on the axis at a lower end of the body for discharging drilling fluid downward between the legs;

first, second, and third cutters, each rotatably mounted to one of the bit legs;

the first cutter having a metal shell with an outer row and an inner row of milled hardfaced teeth formed thereon, the metal shell having a smooth conical surface extending inward from the inner row of teeth, the smooth conical surface being free of hardfacing;

a spear point having a neck which joins the conical surface of the first cutter, the spear point having a plurality of blades extending from the neck, the blades converging to an apex and being circumferentially separated from each other about an axis of the first cutter, defining a space between each of the blades; and a layer of hardfacing formed on the neck, the blades and the spaces between each of the blades, the hardfacing being tungsten carbide particles in a matrix for protecting the neck and spaces from erosion due to drilling fluid being discharged out the nozzle, the matrix being selected from a group consisting of iron, cobalt, nickel and alloys thereof.

2. The bit according to claim 1, wherein the layer of hardfacing has a thickness in the range from 0.020 to 0.250 inch.

* * * * *